April 21, 1959  C. LORENZEN  2,882,944
PIT REMOVAL MECHANISM
Filed Sept. 28, 1955  3 Sheets-Sheet 1

INVENTOR.
COBY LORENZEN
BY
Lippincott & Smith
ATTORNEYS

INVENTOR.
COBY LORENZEN
BY
Lippincott & Smith
ATTORNEYS

April 21, 1959
C. LORENZEN
2,882,944
PIT REMOVAL MECHANISM
Filed Sept. 28, 1955
3 Sheets—Sheet 3
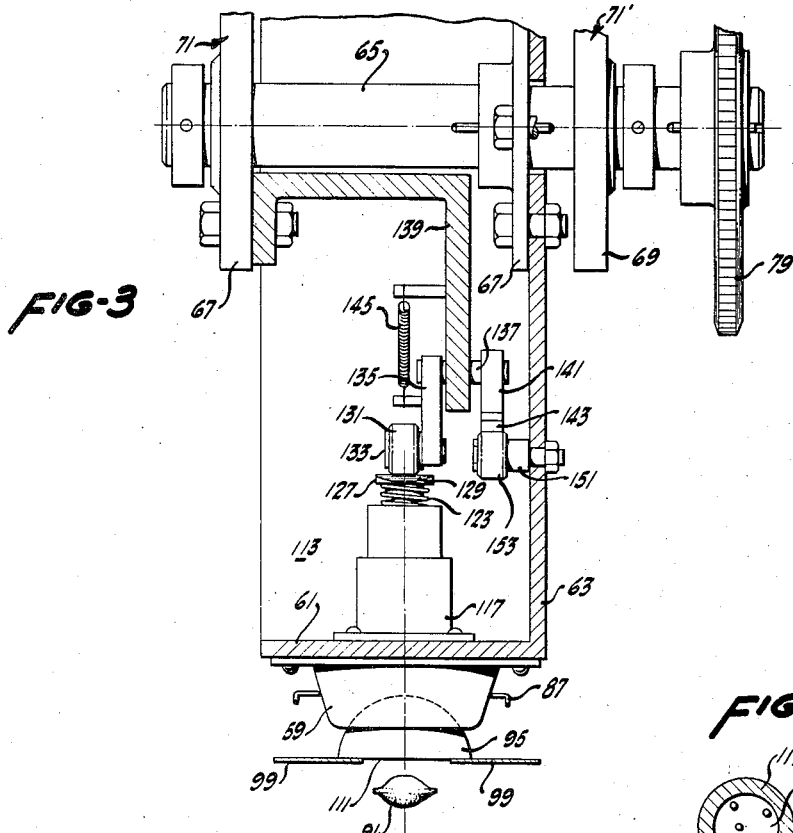
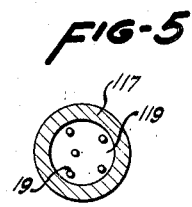
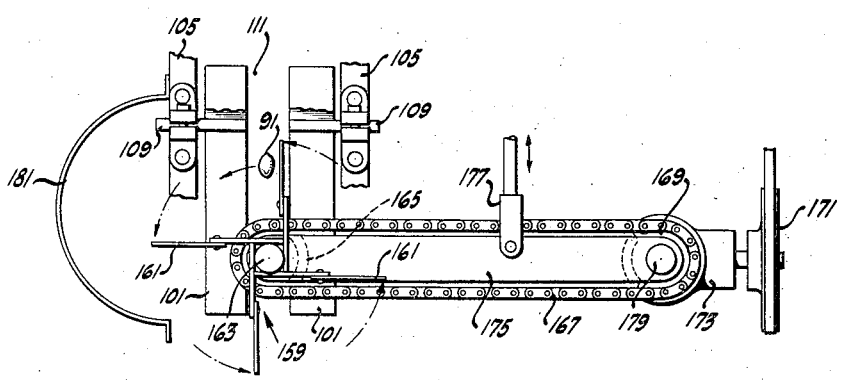
INVENTOR.
COBY LORENZEN
BY
ATTORNEYS

United States Patent Office 2,882,944
Patented Apr. 21, 1959

2,882,944

PIT REMOVAL MECHANISM

Coby Lorenzen, Davis, Calif., assignor to The Regents of the University of California, Berkeley, Calif., a corporation of California Application September 28, 1955, Serial No. 537,085

8 Claims. (Cl. 146—28)

This invention relates to apparatus for use in the fruit industry for the removal of the fruit pits or stones from fruit pieces following division into halves and prior to a drying operation.

In the fruit industry it is customary, prior to the placing of fruit pieces upon trays or tables for drying, to cut the fruit, for which drupes, such as apricots, peaches or the like, will be used as illustrative examples, into halves, and then to spread the halved portions uniformly over trays following pit or stone removal. In the cutting operation, if the fruit is not to be damaged, the cut should preferably be taken in one single slice and from the outer skin of the fruit and thence through the flesh to the pit or stone. Under these circumstances, the division is usually of such a sort that it is not possible to predict with certainty whether the pit or stone will remain with one half or the other. Following cutting, the pit or stone may, for some fruit pieces, be in a position with respect to the fruit half such that its long dimension is generally parallel to the plane of the cut, but in other pieces where the drupe is turned during the operation even if the long dimension of the pit or stone is substantially parallel to the plane of the cutting operation, the shorter of its transverse dimensions will be flat side against the plane of the cutting operation or normal thereto. In still other instances the long dimension may even be normal to the plane of the cut.

Regardless of the pit position with respect to the halved fruit section it is essential to first grade dried fruit sections that the pits all be removed prior to drying. Various ways to achieve the end result have been heretofore suggested, even to providing manual operations, but none, so far as is known, has provided satisfactory, rapid enough for high speed operations or sufficiently fool-proof to insure widespread use.

Therefore, the present invention seeks to provide ways and means for rapidly and efficiently removing the pits or stones from the halved drupe sections without regard to which half the pit may adhere following a cutting or division into two parts. As the invention is constituted, the drupes from which the pits are to be removed are moved past cutting devices and located and held with respect thereto by a pair of cup members, one of which may serve to support the fruit pieces and the other of which may serve to locate and secure the fruit pieces with respect to the first support cup. The cups for locating the fruit are positioned in a series arrangement along two separated paths which approach a tangent relationship at the region of cutting and then subsequently diverge with respect to each other.

In one particular form of arrangement, which will herein be described as an illustrative embodiment of the invention, the fruit locating cups of one path are arranged in a series about the periphery of a drum, each cup being uniformly spaced with respect to the preceding and following cup. The cups along the other path, in one such illustrative embodiment, are also equally spaced from each other and for at least a part of the path length also occupy an arcuate path constituting a part of a drum periphery, although the remainder of the path may be along the surface of an endless belt or caterpillar which is driven in any appropriate manner. The two drums which will illustrate the operation of the invention are preferably of like diameter and rotate under the control of suitable drive mechanism at like speeds, one turning clockwise and the other counter-clockwise. The cups supported relative to each of the drums are separated at the cutting point only by a distance corresponding to the diameter of the fruit section which is to be handled at the cutting point. The separation is appropriately controlled in such a way that it becomes greater for larger size pieces of fruit and lesser for smaller size pieces of fruit, the reference herein to "diameter" being used illustratively and on the assumption that the fruit is a spheroid.

Rotation of the drums in the clockwise and counter-clockwise directions causes the cups arranged along each path to move arcuately with respect to each other and to separate or diverge with respect to each other during the course of motion and subsequent to the fruit division.

As the invention will be described, the fruit locating cups of one path are circumferentially arranged with respect to one of the drums throughout a full 360 degrees. The cups moving around the other drum traverse the drum periphery for a portion of the drum circumference and then follow the path of an endless belt or conveyor. In this use, the conveyor is used at a point remote from the drum for receiving the fruit components which are to be halved, and from which the stones or pits are to be removed. It will be appreciated, however, that each series of fruit locating cups may readily and similarly be positioned with respect to a pair of endless belts caused to travel paths such that they substantially meet at a cutting point, and then diverge subsequent thereto, with one half of the cut fruit being located, subsequent to cutting, by the cups of one path and the other half of the cut fruit piece being located by the cups of the other path. Likewise, provided loading can be accomplished readily, the cups could be held upon the periphery of both drums. The example herein to be described, however, proved to be best adapted to high-speed commercial uses.

Following the paths traversed by the fruit locating cups subsequent to cutting, are a plurality of guide members maintained for a portion of the path length, following cutting, in a relationship such that the guides are generally uniformly spaced from the paths traversed by the individual fruit locating cup members. To compensate for different fruit sizes, the guides are made generally resilient or flexible so as to be subject to being slightly shifted in position by force exerted by the fruit pressure thereon with changes in fruit size, in order that the spacing between the guide and the fruit locating cups may be adequate to accommodate the fruit pieces. The guide strips each have a centrally recessed portion extending for a part of the length, or the guide paths may be arranged as a pair of tracks separated by distances of the order of the large dimension of the fruit pit which is to be removed from the fruit halves. In the latter case, both tracks extend at a generally uniform distance from the path followed by the fruit locating cups.

At a point between the cutting point, whereat the pair of guide tracks meet and from which they diverge or separate, and the end of the guide tracks, a pit remover mechanism is caused to function in a way such as to protrude through one of the fruit locating cups in the direction of the guide track and within the region bounded by the slot formed therein. Accordingly, any fruit pieces located by the cups and supported at their edge by the guide tracks will be held with the cut edge against the guide track and the skin surface in the cup during the pit removal operation, with the pit-ejecting pins caused to press through the fruit skin and the flesh to force the pit outwardly from that half section to which it adheres following cutting.

There is also provided as a part of the invention a mechanism to cause the pit ejecting device to function once as each fruit locating cup moves along the guide track, and at a point between that at which the division into halves occurs, and the point from which the fruit half-section is ejected from the guide track. While this is happening it is desirable to provide a convenient means to remove the ejected pits or stones in a way such as to disperse them externally of the path followed by the fruit sections, in order that in final drying the dried components shall include only the fruit halves from which the pits have been removed and shall be completely pit free.

In accordance with the foregoing generalized description of the invention, it will become apparent that the invention has among its objects those of providing a convenient mechanism for removing pits or stones from fruit sections at a rapid rate, and to cause the pit or stone removal or rejection to occur without injury or damage to the fruit section, and at a rate coinciding with both the rate of feed and of fruit division.

Other objects of the invention are those of providing an mechanism whereby fruit carried along a conveyor and divided into separate components may be rendered free from the pit or stone, regardless of which of the divided sections retains the pit after cutting.

Further objects of the invention are those of providing pit removal mechanism which is highly efficient in its operation and use; for which there is little chance of mechanical failure; which when functioning to remove the pit or stone merely produces minute size perforations through the skin which are generally unobservable after drying; which will function regardless of the size of the fruit section of the divided components; and for which there is little chance of mechanical failure.

Other objects and advantages will become apparent from reading the following description and claims in accompaniment with the following drawings, in which Fig. 1 is an elevation schematic view of a portion of a fruit handling machine, in which the pit removal mechanism is utilized;

Fig. 3 is a sectional view taken on the line 3—3 of Fig. 2 looking in the direction of the arrows, for the purpose of depicting the operation of the pit ejecting mechanism;

Fig. 4 is a sectional view taken on the line 4—4 of Fig. 1 looking in the direction of the arrows, to indicate the operation of the fruit pit or stone flipper; and Fig. 5 is a view in section taken along the line 5—5 of Fig. 2 looking in the direction of the arrows, to show the location of the prongs or pins of the stone or pit ejector.

Figure 1:
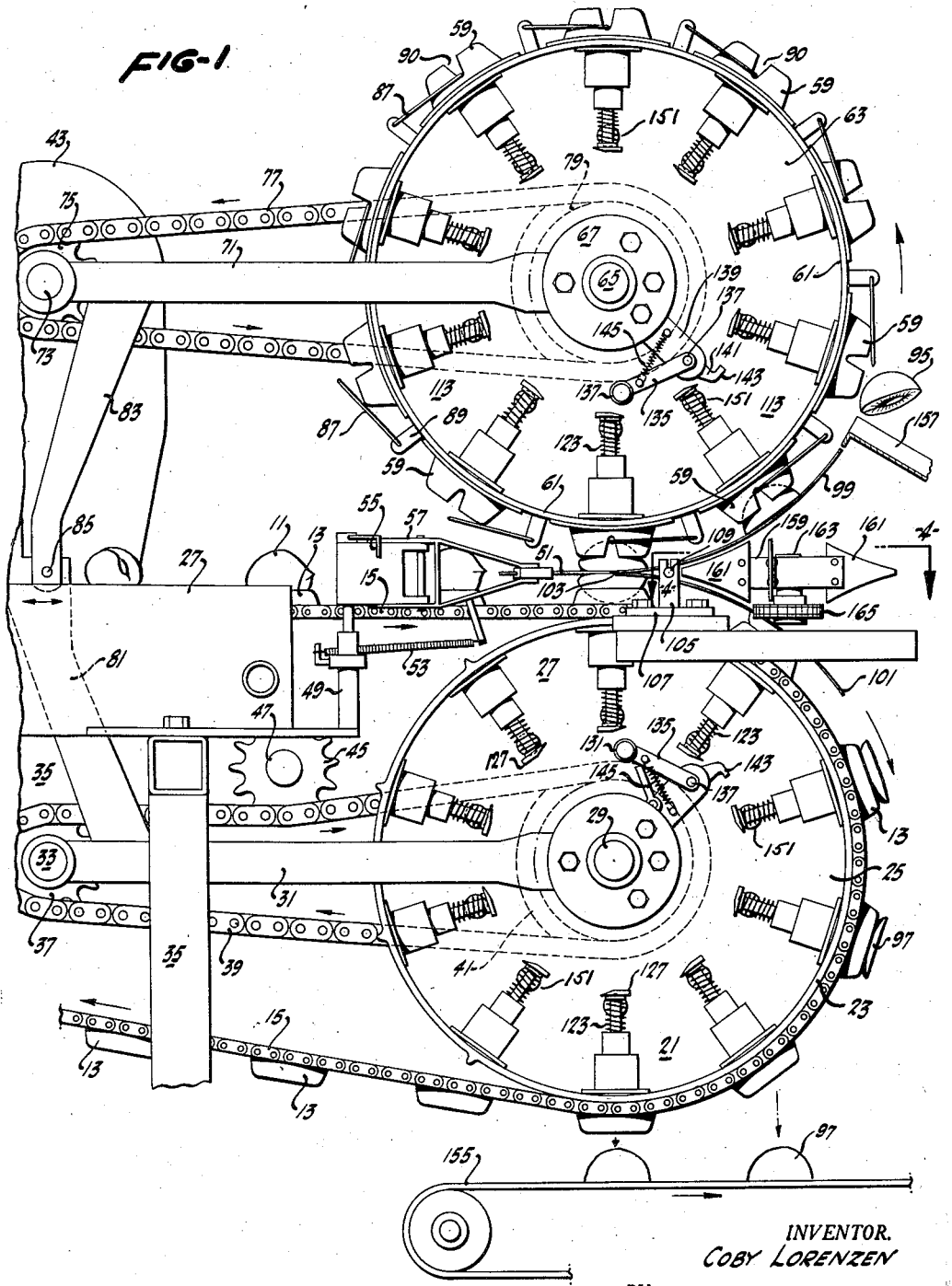

Now referring to the drawings for a further understanding of the invention, the fruit components 11 are shown as initially supported on fruit support cups 13, which are secured to or formed directly with a conveyor mechanism 15 adapted to move in the direction conventionally illustrated by the arrows shown adjacent thereto. The fruit locating or support cups 13 have a central opening 17 extending therethrough, which opening also extends completely through the surface of the conveyor mechanism. This provides a central passage through each support cup through which, if desired, liquid may be ejected for fruit orientation (not herein considered), utilizing the central opening 17 as a nozzle, or which central serves as a passageway through which the pit ejecting pins or prongs 19 (later to be described in more detail) may protrude at selected time intervals, the pit ejecting mechanism as a unit being schematically designated at 21.

As the invention has been shown, the conveyor, on which the fruit support or locating cups 13 are secured, is caused to travel about the periphery 23 of a drum 25, about which it is wrapped in the illustrated form of the invention, for just slightly more than 180°, although it is to be understood that this is purely illustrative, and the contact between the conveyor and the drum may be slightly more or considerably less angular extent without departing from the general spirit of the invention. The conveyor belt passes adjacent to and over a suitable fruit positioning device, which need not be described herein in detail, but which serves to orient the fruit in a way such that its plane of suture, or long dimension as herein considered, is generally parallel to the plane of the conveyor. This particular orientation component, however, forms no specific part of the present invention and is mentioned at this point primarily to point out an additional feature of the conveyor mechanism.

U.S. Patent 2,793,734 granted to this applicant on May 28, 1957, and entitled "Fruit Orienting Mechanism" shows one suitable form of such apparatus.

The drum 25 is mounted for rotation about a shaft or axis 29, which is secured in suitable bearings (not shown) at the ends of drum support arms 31, there being similar arms at the opposite ends of the drum (the second arm not shown in illustration provided). The arm 31 for carrying the drum is supported at its other end from a shaft 33 so as to be movable thereabout to a limited extent in arcuate fashion, the permissible angular rotation being indicated by the arrows. The shaft 33 is supported in any desired manner (not shown) upon a frame conventionally illustrated at 35. This shaft carries keyed thereupon a suitable drive sprocket 37, about which a driving chain 39 is secured. The chain is wrapped about a driving sprocket 41 secured to the drum 25. The drive sprocket 37 is turned by any desired mechanism (not shown) from a suitable prime mover, conventionally represented at 43. Tensioning of the drive chain 39 is accomplished in well known manner by the adjustable idler sprocket 45 also attached in any desired manner (not shown) to the frame 35 in a way such that the shaft 47 upon which it is carried may be held by bearings within the frame and moved to a limited extent to make tensioning adjustments of the drive chain as desired.

Figure 2:
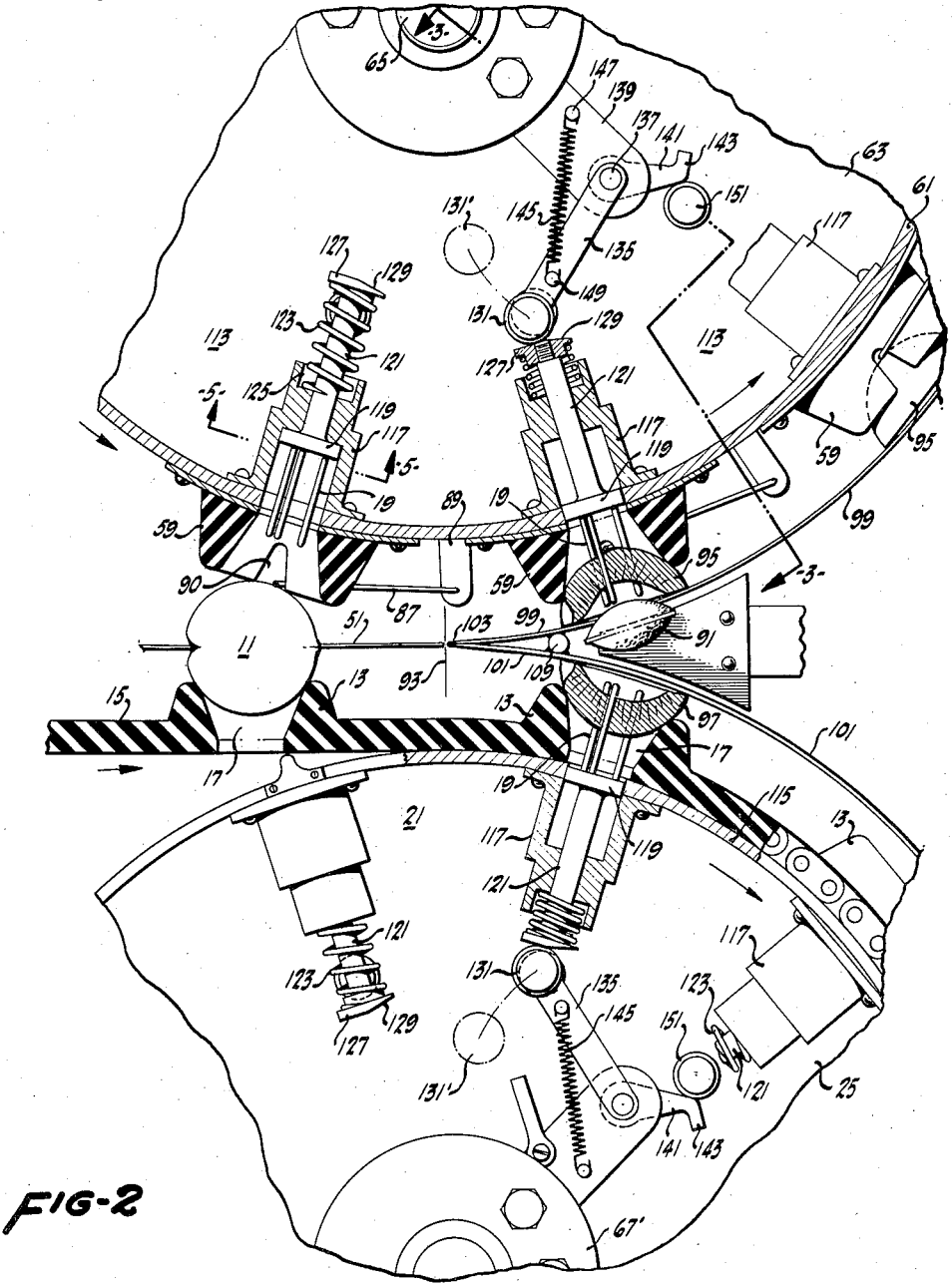
Fig. 2 is an enlarged view, generally in section, of a part of the mechanism shown by Fig. 1, particularly depicting the operation of the pit removal mechanism and the guiding of the fruit sections on the guide track adjacent to each carrying path.

There are also supported from the frame 35, and arranged to turn about a support shaft or spindle 49 as an axis, a pair of cutting knives 51, one of these knives being located adjacent to the conveyor 15 from the side at which the conveyor is viewed in Fig. 1, and the other similar knife of the pair being arranged on the opposite side of the conveyor and inwardly from the plane of the paper, looking at Fig. 1, but which other knife is represented in the sectional view of Fig. 2.

The cutting knife 51 of Fig. 1 is appropriately spring-biased, as shown by the spring 53, so as to tend to turn in a counter-clockwise direction, looking down upon its support shaft 49. Its clockwise rotation occurs against the force of the spring and is that due to the force which is imparted to it by a piece of fruit 11 moving along the conveyor and striking the forward edge of the blade of the knife 51 outwardly in a clockwise direction, the limit of which motion is established by a pin 55 contacted by the upper bifurcated arm 57 which supports the cutting blade. The blade on the opposite side of the conveyor, of course, will move in the opposite direction and its motion will be similarly limited, except that the limitation of motion will occur in the reverse direction.

In the form in which the mechanism has been depicted, a series of fruit locating cups 59 of a shape and form generally similar to the cups 13 is secured about the periphery 61 of an upper drum 63. Drum 63 is supported upon a shaft 65 which passes at one end through a bearing member of suitable characteristics in an end support ring 67, and at substantially its other end in a similar support ring 69. The ring 67 preferably forms the termination of an upper support arm 71 and is secured to the drum in any desired manner. It will be observed from the showing of Fig. 3 that the support arms 71 and 71' terminate at opposite sides of the drum in the end support rings 67 and 69, which is generally similar to the fashion of supporting the lower drum 25 from the arms 31 (of which only one is shown). The support arms 71 and 71' are held about a shaft 73 which is also suitably held by bearings (not shown) on the machine frame. It has a drive sprocket 75 attached thereto. The drive sprocket is driven from the conventionally indicated prime mover 43 to drive the drive chain mechanism 77 which at one end wraps around the drive sprocket 75, and its other end about the teeth in the driven sprocket 79 which is secured to the drum shaft 65, thereby to turn the drum and the fruit locating cups 59 attached to its periphery.

Drum 63 is driven at a speed such that the upper fruit locating cups 59, at about the point where the cutting operation of the fruit by the knives 51 occurs, shall be moving with a direction of motion along the conveyor path at a speed which is substantially identical to that of the conveyor speed in the same direction. The upper fruit locating cups 59 and the lower fruit support or locating cups 13 are substantially tangent (except for the space occupied by the fruit pieces 11) at this cutting point.

Variations in sizes of the fruit pieces are taken care of by a pair of arms 81 and 83, secured respectively to the drum support arms 31 and 71. The arms 81 and 83 are appropriately linked together, as indicated conventionally by the pin 85, so that with motion of the pin and the thereby established connection to the right or to the left, as the case may be, and operating under the control of the size of the fruit being handled, will cause the drums 25 and 63 to be spread further apart, or to come closer together, the spreading being for larger fruit pieces and the coming together being for smaller fruit pieces. The control of this mechanism is not a part of this invention, and it is, therefore, not shown in detail, although it is to be noted that in a complete machine operation this factor is to be considered. As fully described by applicant's copending application Serial No. 537,242 which was filed concurrently with this application this form of control is established under the control of a series of suitable bails 87 held from supports 89 on the drum, which bails, prior to the cutting operation, rest upon the fruit pieces as they are fed along the conveyor (see Fig. 2) and through appropriate mechanism (not shown) establish the adjustment of the drum positions. In the upper position of the cups the bails fall within a slot 90 in the cups.

According to this invention, assuming that the fruit pieces have been cut in half by the cutting knives 51, as shown, it is next important that the pit or stone 91 held in one or the other halves thereof should be removed. To this end, the individual pieces, after having passed the cutting point schematically represented on Fig. 2 by the dot-dash line indicated at 93, are caused to follow, in half sections, the travel path of the individual fruit locating cups 13 or 59, as the case may be, the upper fruit piece half 95 remaining adjacent to the fruit locating cup 59 and the lower fruit half 97 remaining located within the fruit support and locating cup 13. This positioning is maintained by the aid of a pair of guide tracks shown at 99 for the upper track and 101 for the lower track which two tracks substantially meet at a sharply formed meeting point 103 (see particularly Fig. 2). The tracks are held from a guide track support bracket 105 secured to the end 107 of the frame 35'. The separate guide tracks 99 and 101, at the point of support from the bracket 105 are appropriately spaced from each other by the pin 109 and with securement at the ends 103 are caused to follow the general peripheral contour of the lower and upper drums 25 and 63. The guide tracks are each resilient in character so as to be capable of moving or springing about the securement to the bracket 105 as a pivot, especially in case an extra large size fruit piece tends to bend the guide. Each of these tracks is formed in the region between its outer end (the point most remote from securement to the support bracket 105) and the bracket with a slotted section 111 (illustratively, see Fig. 3 for the upper track and Fig. 4 for the lower track) so that a fruit half moving along the guide tracks and held with its outer skin portion positioned within the conical section of the cup 13 or 59 will slide at its cut edges plane (see Fig. 3) along the guide track. The slot width 111 is adequate to permit a pit or stone 91 which may be pushed outwardly from the fruit half by the pit removing mechanism to pass through the slot.

The mechanism herein shown for removing the pit or stone and which is conventionally represented as a unit for the lower pit ejecting mechanism, is shown at 21 and at 113 for the upper pit ejecting mechanism. Fig. 2 in particular shows the components of the ejecting mechanism which extends through the periphery 61 of the upper drum, illustratively, and the periphery 115 of the lower drum in the region of the cup openings.

For the purpose of supporting the particular ejecting mechanism there is secured inwardly of the drum periphery, a suitable cylinder 117 (of which only the upper mechanism will be described at this point since the lower component is similar) within which there is positioned a piston 119 having the pit ejecting pins 19 extending outwardly therefrom. The pins 19 are arranged generally in the form shown by Fig. 5 so that regardless of the orientation of the pit or stone 91, movement of the pins through the central opening in the cup and preferably through the drum periphery will be such that the skin and flesh of the fruit half is penetrated and the pins protrude sufficiently far in the direction of the guide tracks so that one or more of the pins of the group will serve to dislodge the pit or stone, as schematically illustrated by Fig. 2. As the pins are shown in Fig. 5, it is assumed that the bail will extend in a direction parallel to the axis of the drum 27 or 113 and consequently it will extend between the three pins shown at the left of Fig. 5 and the two pins shown at the right of Fig. 5. However, in some instances, the outer pins may be spaced at a uniform distance from the center of the piston 119 and each located with 90° spacing from the other, in which case the fifth pin may be located at the center of the piston. When this arrangement is provided, the bail is bent to an extent such that it is alined at one side or the other of the three pins which come into alinement. In some instances this arrangement is desirable because it allows the pins to survey evenly the area occupied by the pit of the fruit piece located by the cup and also it offers the opportunity by bending the bail to permit it to cross the end plane of the piston at a point where the pin spacing is greatest. The arrangement here shown by Fig. 5 is purely illustrative and has been proposed solely for convenience of illustration and because the bails 87 are shown to fall within a transverse opening 90 in the fruit locating cups where the opening extends transversely in the center of the cup. The piston 119 is held at the end of a shaft 121, which protrudes through the cylinder wall through any desired packing (not shown). At the opposite end of the shaft there is positioned an expansible spring member 123, the inner end of which is seated in a cup member 125 on the outer wall of the cylindrical member 117. The outer end of the piston shaft 121 terminates in a flattened head 127, the forward edge 129 of which is beveled, as indicated, and which serves the purpose of permitting a cam roller 131 to depress it.

The cam roller 131 is carried upon a pin 133 which is held upon the forward end of an arm 135 which is secured upon a pin 137 carried on a bracket 139 which is secured, in turn, to the drum end support ring 67 of the upper drum and a similar ring 67' of the lower drum. There is also attached to the pin 137 a second depending crank arm 141 which terminates in a contact shoe or cam element 143. By securely fastening each of the arms 135 and 141 to the pin 137 the combination forms essentially a bell crank lever, to one outer end of which the cam roller 131 is secured and the other end of which terminates in the contact shoe or element 143. The arm 135 is normally maintained clear of engagement with any of the flattened heads 127 of the piston shaft 121 by means of a spring 145, secured at one end to the bracket 139 by a pin 147 and at its opposite end by a pin 149 to the arm 135.

There is arranged on the drum 63 to extend inwardly therefrom at points corresponding in number to the number of fruit-locating cups inwardly extending pins 151, which terminate in cam rollers 153. Generally speaking, and for illustrative purposes, the pins 151 may be considered as opposite each fruit-supporting cup. This, however, is a matter of design consideration, and the pins may be located on the drum 63 between various cups, the choice being determined by the length of the bell crank formed by the arms 135 and 141.

As the drums 63 and 25 rotate the pins 151 and the thereto attached cam rollers likewise rotate, so that each time one of the pins 151 and its associated cam roller comes beneath the contact shoe or cam element 143 the outer end of the arm 141 moves inwardly from the periphery of the drum. Concurrently, the cam roller 131, attached to the outer end of the arm 135, moves toward the drum periphery to strike the beveled forward edge 149 of the flattened head 127 of the piston shaft 121 to depress the piston and move it within the cylinder 117 to a point such that the pins 19 secured to the bottom of the piston 119 project through the central opening in one of the fruit-locating cups 13 or 59, as the case may be. This projection causes the pit-ejecting pins or prongs 19 to penetrate the skin and flesh of the fruit half located by the cup, so that one or more pins press against the pit or stone 19 which is therein contained within the fruit section and eject it (see Figs. 2 and 3, for instance).

As soon as the drums 63 and 25 rotate to a position such that the pins 151 are carried beyond the contact shoe or cam element 143 the spring 145 draws the cam roller 131 away from the previously depressed flattened head 127 to permit the expansible spring 123 to draw the piston 119 once more within the cylinder 117 and thereby to retract the pins or prongs 19 interiorly of the fruit-locating cup.

The operation continues as each successive pin 151 comes into contact with the contact shoe or cam element 143, and, looking at Fig. 2, in the time intervening the cam roller 131 is drawn inwardly by the spring 145 to a position indicated at 131'.

The operation of the pit-ejecting mechanism thus takes place in the region between the commencement of the separate guide tracks 99 and 101 and the outward termination thereof. The precise point of functioning is not material, so long as the pit is completely removed before the fruit halves are moved clear of the guide tracks 99 and 101 by virtue of the rotation of the drums and therewith the rotating fruit-locating cups.

In connection with the fruit half held against the support cups 13 traveling a course determined by the periphery of the lower drum 25, the fruit leaves its confined location with respect to the track 101 and the support cup 13 as soon as any supporting cup travels beyond the end of the guide track and the fruit pieces then fall by gravity, for instance, to come to rest upon the conventionally indicated conveyor belt 155, which is assumed to move in the direction of the arrow, to convey the fruit components falling thereon in the direction of a utilization point. Fruit halves held against the fruit-locating cups 59 by the upper guide track 99, when reaching the end of the guide track, are caused to fall upon the platform chute 157 (see Fig. 1) to slide thereon toward a point of utilization, or even to the conveyor belt 155, if desired.

In order that the fruit pit or stone 91, which is ejected from the fruit half by the pins or prongs 19, shall not become intermingled with the fruit halves from which the pit has been removed, a flipper mechanism 159, comprised of a series of blades 161, is arranged to be rotated rapidly about a support shaft 163, which is suitably supported on the frame 107, and to which is secured a drive sprocket (or other equivalent drive) 165. The drive sprocket is rotated by a drive or chain mechanism 167, turned from a driving sprocket 169 which, in turn, is driven from a further drive sprocket 171 and a conventional form of gear box 173.

It will be apparent that for varying sizes of fruit sections in accordance with the explanation above made the drums 25 and 63 separate, to some extent, for larger fruit sections, and come closer together for smaller sections. Accordingly, to compensate for the drum-shifting positions and thereby the angular position at which the pit-ejecting mechanism functions, the flipper apparatus for which the sprockets 165 and 169 are held on suitable pins carried on the arm 175 make desirable the moving of the flipper mechanism as a whole inwardly and outwardly with respect to the point at which the fruit is divided into halves by the cutting knives 51. This motion is controlled by a unit similar to that which controls the positioning of the drums 25 and 63 relative to each other, and is illustratively here represented by the arm 177 which moves the support arm 175 arcuately about the pin 179 to which the drive sprocket 169 is attached as a pivot.

Under these circumstances, fruit pits or stones 91 pressed outwardly from the fruit halves are caught as they fall by one or the other of the blades 161 of the flipper mechanism, to be carried outwardly from the path of the fruit halves along the guide tracks 101 and 99 and to fall within a collector bin 181.

Various modifications of the invention, of course, will be apparent to those skilled in the art to which the invention is directed.

Having now described the invention, what is claimed is:

1. In fruit handling apparatus, a pair of drum support elements positioned for rotation in proximity to each other, means to rotate the drums in opposite directions about parallel spaced-apart axes, a like plurality of fruit support cups positioned with uniform spacing about the periphery of each drum with one cup of each plurality being adapted, with drum rotation, to become successively alined at the closest point to drum tangency, the said aligned cups of the separated drums when alined being adapted firmly to support and locate a fruit piece therebetween, and each cup having a central opening therethrough, means to cut the flesh of the located fruit piece while leaving the pit unsevered and adhering to one of the fresh-cup sections, a normally retracted piston member extending internally of the central opening through each cup from within the drum toward the periphery, pit ejecting pin means connected with the piston to be movable through the cup to eject fruit-retained pits, guide track means having a central slot positioned adjacent to each drum, the guide track means meeting approximately adjacent to the fruit-cutting point and extending on opposite sides of the cups along each drum periphery for an arcuate distance greater than the separation on the drum periphery of adjacent cups and spaced from the drum periphery by substantially a distance corresponding to one-half the diameter of the fruit piece, and means to force the piston in each cup through the cup central opening during its arcuate travel between the cutting point and the end of the guide track to eject the fruit pit through the guide track slot.

2. The apparatus claimed in claim 1 comprising, in addition, means moving transversely of the guide track at the point of pit ejection for moving the ejected pit away from the track.

3. The device claimed in claim 1 wherein the pit ejecting means comprises a plurality of nonuniformly spaced pins arranged to protrude through the opening of the fruit locating cups.

4. A device for removing the pit from either part of halved fruit sections to one of which it adheres which comprises a plurality of uniformly spaced and serially arranged fruit-locating cups positioned along two paths which approach tangent relationship at one point and then diverge with respect to each other, one half-section of each fruit piece being adapted to be positioned by one cup of one series and the complementary half section being adapted to be positioned by a cup of the other series each to move along the separate paths, a pair of spaced guide tracks extending generally along each cup path for a portion of a path-length from approximately the point of closest approach of the paths where the tracks of each pair approximately meet, each guide track being substantially uniformly spaced from the path traversed by the cups therewith associated, said tracks each having a centrally open strip for the major portion of the guide track length, the edges of the guide tracks comprising spaced-apart means for holding any fruit pieces positioned against the cups along their edges as the paths diverge relative to each other, means for moving cups along the two diverging paths relative to the guide tracks from the point of closest approach of the tracks to each other so that each cup on each path is sequentially moved adjacent to the tracks, pit ejecting means, and means located adjacent to each guide track for reciprocating the pit ejecting means once during the motion of each cup relative to the centrally open strip of the fixed guide tracks thereby ejecting the pit retained by the supported half-section through the centrally open strip.

5. A device for removing the pit from either part of halved fruit sections to one of which it adheres which comprises a plurality of sets of uniformly spaced and serially arranged fruit-locating cups positioned along two circular paths which approach tangent relationship at one point and then arcuately diverge with respect to each other, one half-section of each fruit piece being adapted to be positioned in one cup of one set and the complementary half section being adapted to be positioned by a cup of the other set, the fruit section halves being adapted to move along the same separate paths as the related cup, a pair of spaced guide tracks, one track being supported adjacent to the path traversed by each cup of one set and the other track being supported adjacent to the path traversed by each cup of the other set, each track extending for the total portion of a path-length and extending outwardly from approximately the point of closest approach to the paths to diverge relative to the other, each track having a centrally located slot between the track edges so that the fruit pieces are adapted to be held against the cups as the paths diverge relative to each other only by the guide edges, means for moving cups of the sets along the two paths from the point of closest approach so that each cup on each path is sequentially moved adjacent to one of the fixed tracks, pit ejecting means, and means located adjacent to each guide track for reciprocating the pit-ejecting means once during the motion of the therewith-associated cup adjacent to the guide track as the cup traverses the region of the centrally located slot between the track edges so as to eject any fruit-held pit from the fruit flesh of supported half-sections through the slot.

6. The device claimed in claim 5 wherein the pit ejecting means comprises a plurality of nonuniformly spaced pins arranged to protrude through the opening of the fruit locating cups.

7. The device claimed in claim 5 wherein the pit ejecting means comprises a piston having a plurality of spaced pins protruding through the opening of the fruit locating cups, means for holding the piston normally retracted, and cam means to cause the ejecting means to protrude through the cup opening against the retracting force.

8. Pit ejecting apparatus comprising a support member, a series of fruit locating cups supported about one surface of said member, each of said cups having an internal opening extending through to the support, a piston secured on the opposite side of the support from the fruit locating cup, a plurality of pins extending outwardly from the piston, means for holding the piston and the pins carried thereby normally retracted, cam means to move the piston to cause the outwardly extending pins to protrude through the wall of the support and outwardly through the opening in the fruit locating cup thereby to dislodge the pit from any fruit piece adapted to be located by and within the cup, a guide track adjacent to the support and extending for a distance greater than the separation between adjacent cups and spaced at a substantially uniform distance from the support, said track having a central slot extending for at least that part of the length thereof which corresponds to the distance at which the fruit cups are spaced from each other, and means to move the pins through the support and the central opening in the fruit locating cup in cyclic fashion in substantial alinement with the slots.

References Cited in the file of this patent

UNITED STATES PATENTS

| | | |
|---|---|---|
| 1,357,004 | Robbins | Oct. 26, 1920 |
| 1,882,381 | Smith | Sept. 8, 1931 |
| 1,901,042 | Robbins | Mar. 14, 1933 |
| 2,354,721 | Walker et al. | Aug. 1, 1944 |
| 2,582,636 | Kruse et al. | Jan. 15, 1952 |
| 2,614,593 | Arengo-Jones | Oct. 21, 1952 |
| 2,710,636 | Kelly | Jan. 14, 1955 |

UNITED STATES PATENT OFFICE

CERTIFICATE OF CORRECTION

Patent No. 2,882,944                                                             April 21, 1959

Coby Lorenzen

It is hereby certified that error appears in the printed specification of the above numbered patent requiring correction and that the said Letters Patent should read as corrected below.

Column 3, line 28, for "an mechanism" read -- a mechanism --; column 8, line 60, for "fresh-cup" read -- flesh-cut --; column 9, line 58, for "to the paths" read -- of the paths --; column 10, line 53, list of reference cited, for the patent number "1,882,381" read -- 1,822,381 --.

Signed and sealed this 12th day of April 1960.

(SEAL)
Attest:

KARL H. AXLINE
Attesting Officer

ROBERT C. WATSON
Commissioner of Patents